United States Patent
Fang et al.

(10) Patent No.: US 12,291,615 B2
(45) Date of Patent: May 6, 2025

(54) PROTON EXCHANGE MEMBRANE MADE OF A CRYSTALLINE SULFONATED POLYIMIDE BLOCK COPOLYMER, PREPARATION METHOD AND USE THEREOF

(71) Applicants: SHANGHAI JIAO TONG UNIVERSITY, Shanghai (CN); JIANGSU LEADER NEW MATERIAL CO., LTD., Wuxi (CN)

(72) Inventors: Jianhua Fang, Shanghai (CN); Xiaoxia Guo, Shanghai (CN); Jingjing Tong, Shanghai (CN)

(73) Assignees: SHANGHAI JIAO TONG UNIVERSITY, Shanghai (CN); JIANGSU LEADER NEW MATERIAL CO., LTD., Jiangsu (CN)

( * ) Notice: Subject to any disclaimer, the term of this patent is extended or adjusted under 35 U.S.C. 154(b) by 847 days.

(21) Appl. No.: 17/610,569

(22) PCT Filed: Aug. 21, 2020

(86) PCT No.: PCT/CN2020/110481
§ 371 (c)(1),
(2) Date: Nov. 11, 2021

(87) PCT Pub. No.: WO2021/043009
PCT Pub. Date: Mar. 11, 2021

(65) Prior Publication Data
US 2022/0213282 A1 Jul. 7, 2022

(30) Foreign Application Priority Data
Sep. 5, 2019 (CN) .......................... 201910838955.7

(51) Int. Cl.
*C08J 5/22* (2006.01)
*C08G 73/10* (2006.01)
(Continued)

(52) U.S. Cl.
CPC ........ *C08J 5/2256* (2013.01); *C08G 73/1042* (2013.01); *C08G 73/1075* (2013.01);
(Continued)

(58) Field of Classification Search
USPC .......................................................... 521/27
See application file for complete search history.

(56) References Cited

FOREIGN PATENT DOCUMENTS

| CN | 110628023 A | * 12/2019 | ............. C08G 73/10 |
| WO | WO 2013/154238 A | * 10/2013 | ............. C08G 73/10 |

OTHER PUBLICATIONS

Asano, et al., "Aliphatic/Aromatic Polyimide Ionomers as a Proton Conductive Membrane for Fuel Cell Applications," J. Am. Chem. Soc. 2006, 128, 1762-1769. (Year: 2006).*

* cited by examiner

*Primary Examiner* — Fred M Teskin
(74) *Attorney, Agent, or Firm* — Bochner PLLC; Andrew Bochner; Eric Kleinertz

(57) ABSTRACT

Disclosed are a proton exchange membrane made of a crystalline sulfonated polyimide block copolymer, a preparation method and use thereof. The crystalline sulfonated polyimide block copolymer has a chemical structure as shown in Formula (I), in which Ar1 group is an aromatic group containing a naphthyl group, Ar2 group is an aromatic group containing at least one sulfonate group, and x is in the range of 5-100, m is in the range of 1-200, and n is in the range of 5-500.

(Continued)

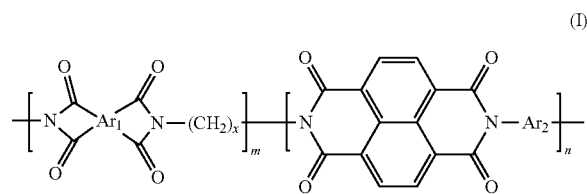
(I)
19 Claims, 5 Drawing Sheets
(51) Int. Cl.
H01M 8/103 (2016.01)
H01M 8/1072 (2016.01)
(52) U.S. Cl.
CPC ......... H01M 8/103 (2013.01); H01M 8/1072 (2013.01); *C08J 2379/08* (2013.01)

PROTON EXCHANGE MEMBRANE MADE OF A CRYSTALLINE SULFONATED POLYIMIDE BLOCK COPOLYMER, PREPARATION METHOD AND USE THEREOF

CROSS REFERENCE TO RELATED APPLICATION

This application is a national stage application of International Patent Application No. PCT/CN2020/110481, filed on Aug. 21, 2020, which claims the benefit and priority of Chinese Patent application Ser. No. 20/191,0838955.7 filed on Sep. 5, 2019. The disclosures of the two applications each are incorporated herein by reference in their entirety.

TECHNICAL FIELD

The present disclosure relates to the technical field of fuel cells, and in particular to a proton exchange membrane made of a crystalline sulfonated polyimide block copolymer, a preparation method and use thereof.

BACKGROUND ART

Proton exchange membrane fuel cells (PEMFC) have advantages such as high efficiency, cleanness and quietness, and have great application prospects in fields such as electric vehicles, electronic equipment, household power generation stations, and aerospace, especially in electric vehicles, which could reduce the dependence of human beings on oil, and is of great significance for human sustainable development and environment protection. Proton exchange membrane is one of the core components of a fuel cell, and its performance and stability is closely related to the power generation performance and service lifetime of the fuel cell. For practical purposes, the proton exchange membrane must meet the following requirements: 1) low cost, 2) high proton conductivity, 3) high mechanical strength and toughness, 4) low swelling ratio, especially along the plane direction of the membrane, 5) excellent chemical stability, especially radical oxidative stability, 6) low fuel and oxygen permeability, and 7) high thermal stability. The perfluorosulfonic acid membrane with a trade name of Nafion® produced by DuPont Company of America is one of the most typical proton exchange membranes, which has the advantages of excellent chemical stability and high proton conductivity, but its disadvantages of high cost, higher fuel permeability, lower working temperature (Nafion® has a glass transition temperature of only about 105° C., and the working temperature of fuel cell must be much lower than its glass transition temperature), higher swelling ratio (18%, 80° C., in water) and poor water-holding capacity at high temperature greatly hinder its wide application in the field of fuel cells. Therefore, in the past two decades, scientists have been devoted to developing sulfonated hydrocarbon polymer proton exchange membranes with low cost and excellent performance to replace Nafion®.

However, there is a general defect in fuel cells assembled from sulfonated polymer proton exchange membrane (including Nafion®) that the power generation performance depends heavily on external humidification conditions; that is, only under high humidification conditions could the fuel cells generate power well. With an increase in temperature, the relative humidity gradually decreases, and at high temperatures (>100° C.), the relative humidity becomes very low (<50%), resulting in very poor power generation performance or even complete loss of power generation ability of common fuel cells. This is because the fact that the proton conduction of sulfonic acid groups in proton exchange membrane structure requires the participation of enough water molecules. Therefore, those skilled in the art devote themselves to developing a proton exchange membrane with high conductivity under the conditions of high temperatures and low relative humidities, so that the assembled fuel cells therefrom have good power generation performance.

SUMMARY

In view of the above defects in the prior art, the technical problem to be solved by the present disclosure is to overcome poor power generation performance of fuel cells caused by low conductivity of the existing proton exchange membranes made of sulfonated copolymers (including Nafion®) under conditions of elevated temperatures and low relative humidities.

To achieve the above object, the present disclosure provides a proton exchange membrane made of a crystalline sulfonated polyimide block copolymer, wherein the crystalline sulfonated polyimide block copolymer has a chemical structure as shown in Formula I Formula I

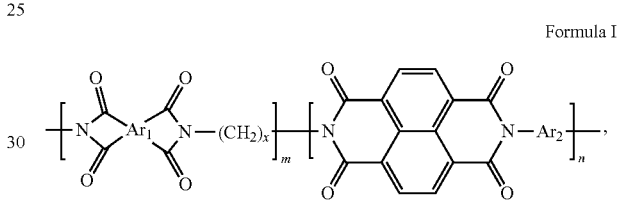

in which, $Ar_1$ group is an aromatic group containing a naphthyl group;

$Ar_2$ group is an aromatic group containing at least one sulfonate group; and x is in the range of 5-100, m is in the range of 1-200, and n is in the range of 5-500.

In some embodiments, the naphthyl group of $Ar_1$ group is connected with

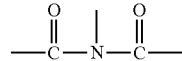

of Formula I to form a six-membered ring, thereby improving the hydrolysis stability of the membrane to the greatest extent.

Furthermore, $Ar_2$ group could improve the electronic cloud density of nitrogen atom connected with $Ar_2$ group, thereby ensuring the hydrolysis stability of the membrane.

In some embodiments, $Ar_2$ group has a linear configuration.

In some embodiments, $Ar_1$ group is selected from the group consisting of

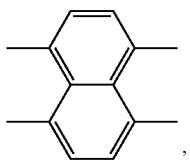

-continued
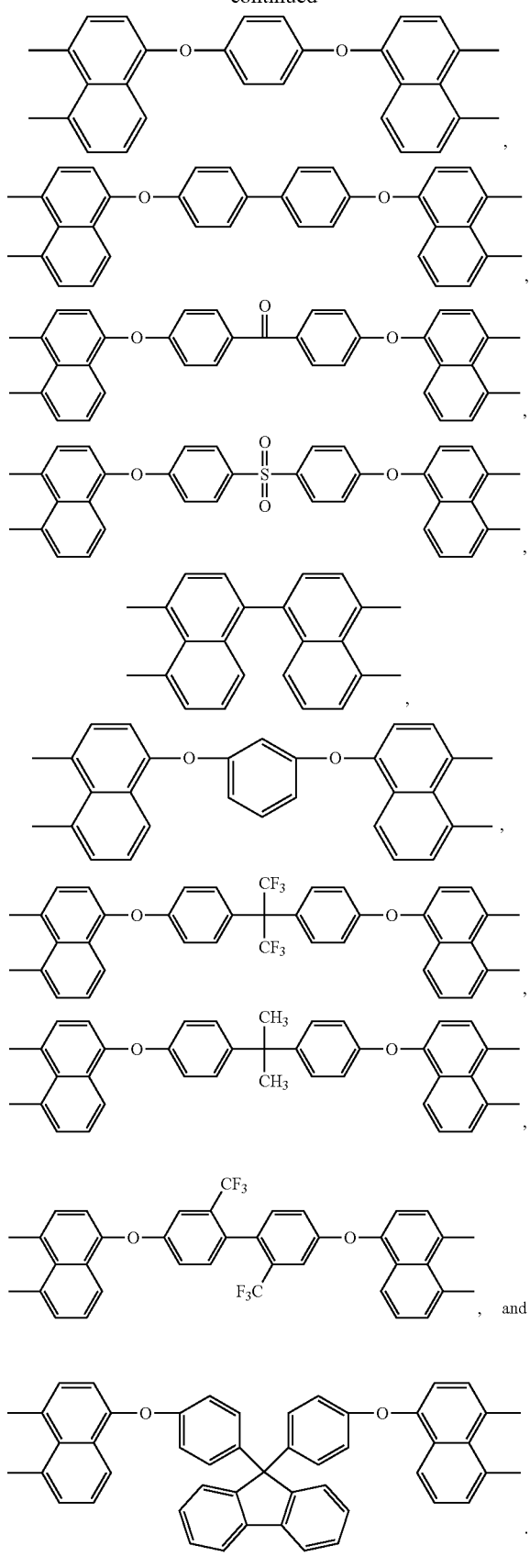
In some embodiments, $Ar_2$ group is selected from the group consisting of
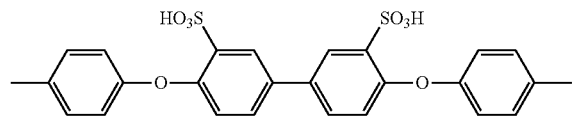
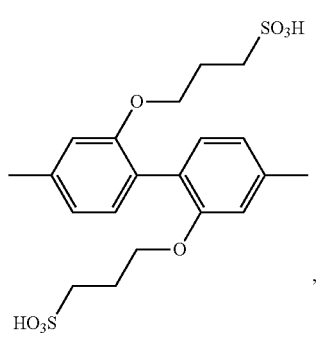

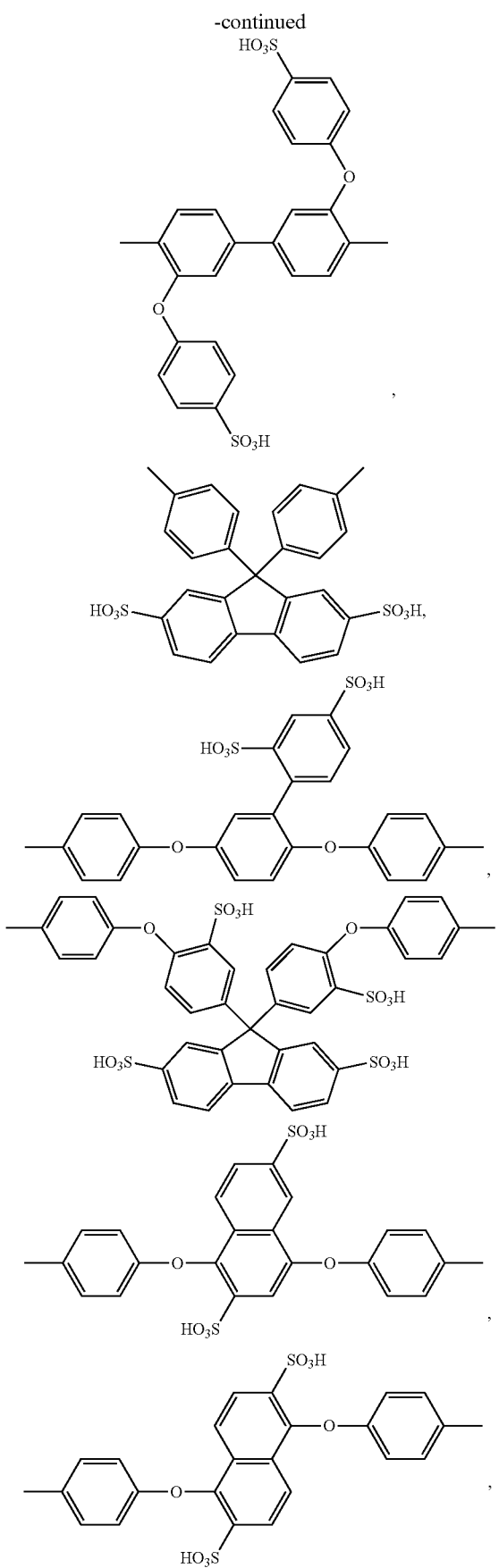

,

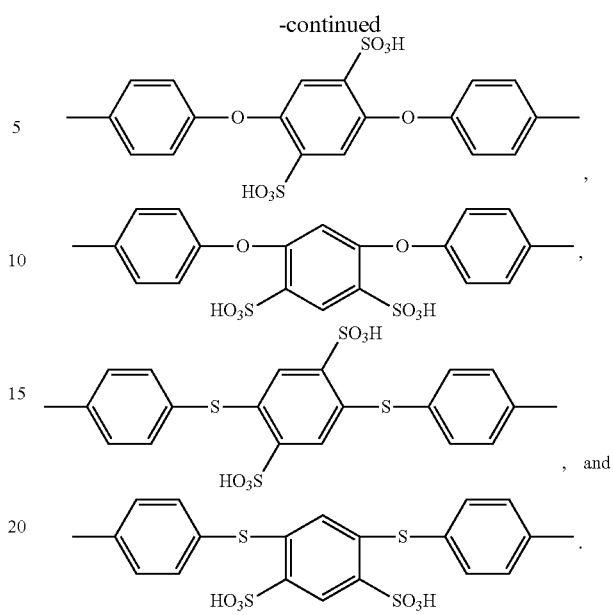

, and

Another aspect of the present disclosure further provides a method for preparing the proton exchange membrane made of crystalline sulfonated polyimide block copolymer, comprising step 1, adding an $Ar_1$-type dianhydride monomer, an aliphatic diamine monomer and a phenolic solvent into a first container, heating to a temperature of 50-120° C. and reacting at the temperature for 1-10 h, then heating to a temperature of 150-200° C. and reacting at the temperature for 2-30 h, to obtain a polyimide hydrophobic block oligomer, wherein the reaction is conducted according to the following equation:

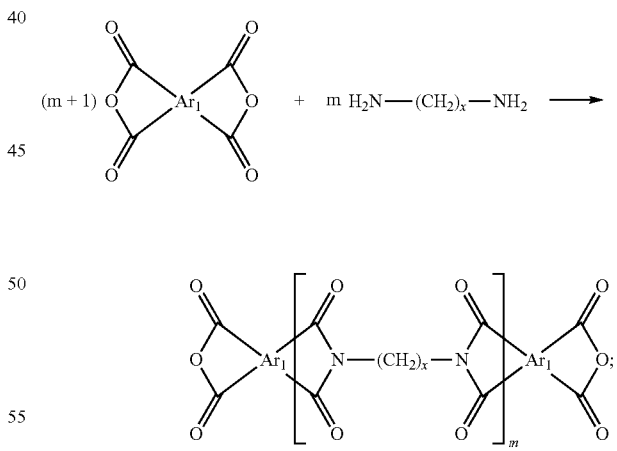

step 2, adding an $Ar_2$-type sulfonated diamine monomer, 1,4,5,8-naphthalenetetracarboxylic dianhydride (NTDA), a phenolic solvent and an organic base into a second container, heating to a temperature of 50-120° C. and reacting at the temperature for 1-10 h, and then heating to a temperature of 150-200° C. and reacting at the temperature for 2-30 h, to obtain a sulfonated polyimide hydrophilic block oligomer solution, wherein the reaction is conducted according to the following equation:

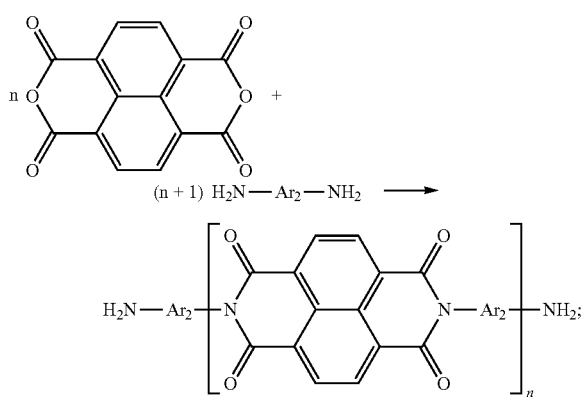

step 3, adding the polyimide hydrophobic block oligomer obtained in step 1 and a phenolic solvent into the second container, heating to a temperature of 150-200° C. and reacting at the temperature for 2-72 h, to obtain a crystalline sulfonated polyimide block copolymer, wherein the reaction is conducted according to the following equation:

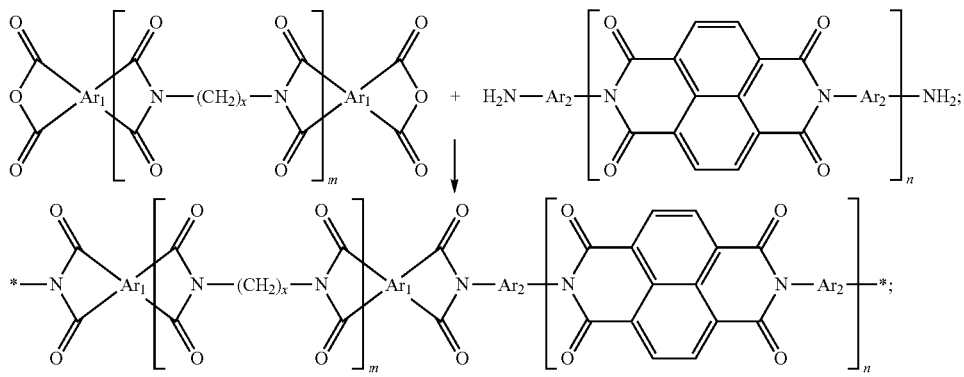

and step 4, making the crystalline sulfonated polyimide block copolymer into a membrane, and subjecting the membrane to a proton exchange, to obtain the proton exchange membrane made of a crystalline sulfonated polyimide block copolymer.

In some embodiments, the method further comprises the following steps:

after cooling the resulting reaction system in step 1 to ambient temperature, adding an organic solvent to yield a first precipitate, and subjecting the first precipitate to a suction filtration and a vacuum drying to obtain a dried polyimide hydrophobic block oligomer, wherein the vacuum drying is conducted at 160° C. for 20 h.

In some embodiments, the method further comprises the following steps:

after cooling the resulting reaction system in step 3 to 20-120° C., adding an organic solvent to yield a second precipitate, and subjecting the second precipitate to a suction filtration and a vacuum drying to obtain a dried crystalline sulfonated polyimide block copolymer, wherein the vacuum drying is conducted at 100° C. for 20 h.

In some embodiments, the organic solvent is one or more selected from the group consisting of methanol, ethanol, isopropanol, acetone and ethyl acetate.

In some embodiments, in step 4, making the crystalline sulfonated polyimide block copolymer into a membrane is conducted as follows:

dissolving the crystalline sulfonated polyimide block copolymer into a phenolic solvent to obtain a crystalline sulfonated polyimide block copolymer solution, casting the crystalline sulfonated polyimide block copolymer solution onto a glass plate, and drying at a temperature of 90-110° C. for 5-15 h to obtain a membrane, and peeling the membrane from the glass plate.

In some embodiments, a concentration of the crystalline sulfonated polyimide block copolymer in the phenolic solvent is in the range of 0.5-25 w/v %.

In some embodiments, in step 4, the proton exchange is conducted as follows:

soaking the membrane in an alcohol solution to remove a residual solvent from the membrane, and soaking the membrane obtained after removing the residual solvent in a proton acid solution for a proton exchange.

In some embodiments, the membrane obtained after the proton exchange is washed with water to be neutral, and then subjected to a vacuum drying, wherein the vacuum drying is conducted at 50-150° C. for 2-30 h.

In some embodiments, in step 1, a molar ratio of the $Ar_1$-type dianhydride monomer to the aliphatic diamine monomer is more than 1, and in step 2, a molar ratio of the $Ar_2$-type sulfonated diamine monomer to NTDA is more than 1.

In some embodiments, in step 1, a molar ratio of the $Ar_1$-type dianhydride monomer to the aliphatic diamine monomer is less than 1, and in step 2, a molar ratio of the $Ar_2$-type sulfonated diamine monomer to NTDA is less than 1.

In some embodiments, the above phenolic solvent is one or more selected from the group consisting of m-cresol, o-cresol, p-cresol, o-chlorophenol, m-chlorophenol and p-chlorophenol.

In some embodiments, in step 2, the organic base may react with the sulfonated diamine monomer, and the organic base is one or more selected from the group consisting of triethylamine, trimethylamine, pyridine and 4-(N,N-dimethylamino) pyridine.

In some embodiments, the method further comprises adding a catalyst in steps 1 and 4, wherein the catalyst is one or more selected from the group consisting of acetic acid, benzoic acid, chlorobenzoic acid, hydroxylbenzoic acid, quinoline, isoquinoline, and pyridine.

In some embodiments, in step 1, a total mass concentration of the $Ar_1$-type dianhydride monomer and the aliphatic diamine monomer in the solvent is in the range of 5-40%.

A third aspect of the present disclosure provides use of the proton exchange membrane made of a crystalline sulfonated polyimide block copolymer in a cell.

In some embodiments, the cell is a fuel cell.

The present disclosure has the following technical effects:

(1) In the present disclosure, a crystalline sulfonated polyimide block copolymer could be synthesized only by a block copolymerization of a common linear aliphatic diamine monomer and a common sulfonated diamine monomer, without complex structure design and synthesis of diamine and/or dianhydride monomers. The preparation process has advantages of simple operation, mild reaction conditions, easy for industrialization production.

(2) The sulfonated polyimide block copolymer of the present disclosure not only has a perfect microphase separation structure, but also has a hydrophobic phase with a significant crystallinity. The crystallinity could induce the hydrophilic phase to aggregate closely and orderly, thus forming a proton conduction channel with good continuity, which is beneficial to proton conduction, reduce the swelling ratio of the proton exchange membrane along the plane direction, and reduce the permeability coefficients of hydrogen and oxygen of the membrane, thereby allowing the membrane to exhibit good thermal stability, high mechanical strength, low swelling ratio (along the plane direction of the membrane) and high proton conductivity.

(3) A single cell assembled from the proton exchange membrane made of a sulfonated polyimide block copolymer prepared in the present disclosure exhibits excellent power generation performance at very low relative humidities, and its power generation performance almost does not depend on external humidification conditions, thus overcoming the problem that the conventional proton exchange membrane fuel cell generally exhibits poor power generation performance at high temperatures (such as 110° C.) and low relative humidities (such as a relative humidity of 25%), or even could not generate power.

In the present disclosure, unless otherwise specified, the terms used have the following meanings:

The term "$Ar_1$-type dianhydride monomer" refers to a dianhydride monomer containing an $Ar_1$ group, such as 1,4,5,8-naphthalenetetracarboxylic dianhydride (NTDA).

The term "$Ar_2$-type sulfonated diamine monomer" refers to a diamine monomer containing a $Ar_2$ group, such as 4,4'-bis(4-aminophenoxy)biphenyl-3,3'-disulfonic acid (BAPBDS).

The term "aliphatic diamine monomer" refers to an aliphatic hydrocarbon with two amino groups, such as 1,12-diaminododecane (DDA).

The concept, specific structure and technical effects of the present disclosure will be further described below in conjunction with the drawings, in order to fully understand the objects, features and effects of the present disclosure.

BRIEF DESCRIPTION OF THE DRAWINGS

FIG. 4-1 shows polarization curves of a preferred embodiment of the present disclosure at 80° C. and different humidification conditions (relative humidity: 20%, 50%, 80%, and 90%).

FIG. 4-2 shows polarization curves of a comparative embodiment of the present disclosure at 80° C. and different humidification conditions (relative humidity: 20%, 50%, 80%, and 100%).

DETAILED DESCRIPTION OF THE EMBODIMENTS

Figure 1:
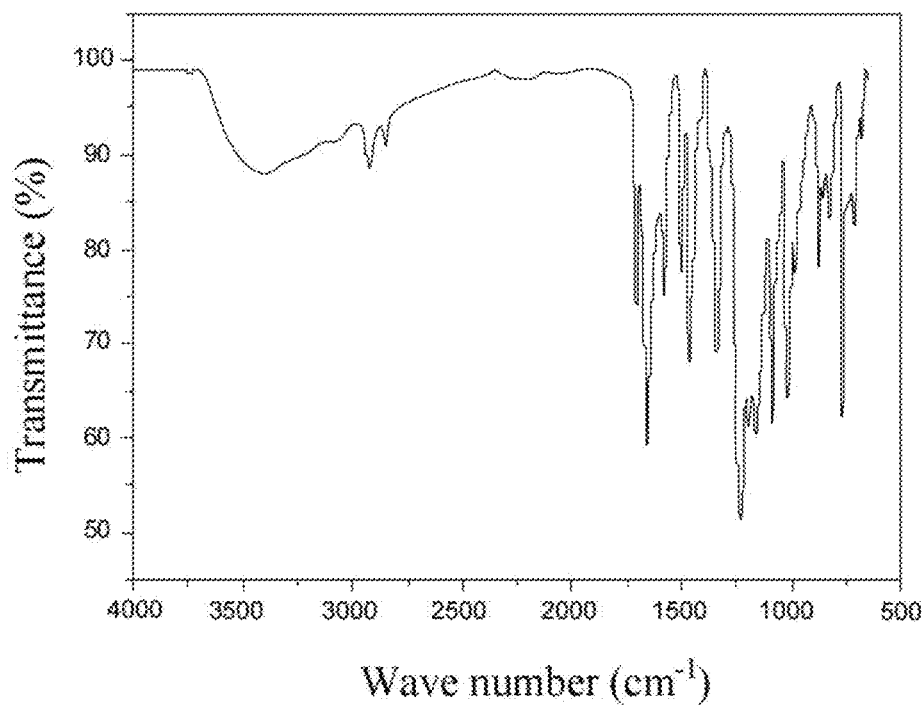
FIG. 1 shows an infrared absorption spectrum of a preferred embodiment of the present disclosure.

The following specific examples of the present disclosure is to further describe the technical solution of the present disclosure, not to limit the protection scope of the present disclosure. Any modifications or equivalent substitutions that do not deviate from the concept of the present disclosure shall fall within the protection scope of the present disclosure.

According to the present disclosure, all operations involving raw materials that are easy to oxidize or hydrolyze were conducted under the protection of nitrogen. In addition, unless otherwise specified, the raw materials used in the present disclosure are all commercially available raw materials and could be directly used without further purification.

Example 1

Under the protection of nitrogen, 2.95 g (11 mmol) of NTDA, 2.004 g (10 mmol) of 1,12-diaminododecane (DDA), 40 mL of m-cresol, 2.687 g (2.2 mmol) of benzoic acid and 3.0 mL of isoquinoline were added to a 100 mL fully-dried three-necked flask in sequence, and stirred mechanically at ambient temperature for 0.5 h. The resulting mixture was then heated to 80° C. and reacted at the temperature for 4 h. The resulting reactant was further heated to 180° C. and reacted at the temperature for 20 h. After cooling to ambient temperature, the resulting reaction system was poured into 150 mL of methanol, obtaining an orange solid precipitate. The orange solid precipitate was repeatedly washed with methanol and filtered by suction. The resulting solid was subjected to an extraction with acetone until the eluent was colorless, and then dried under vacuum at 160° C. for 20 h, obtaining an anhydride-terminated polyimide oligomer, named as X10.

Under the protection of nitrogen, 0.846 g (1.6 mmol) of 4,4'-bis(4-aminophenoxy)biphenyl-3,3'-disulfonic acid (BAPBDS), 12.5 mL of m-cresol and 0.7 mL triethylamine were added to a 100 mL fully dried three-necked flask in sequence, and stirred mechanically at ambient temperature. After BAPBDS was completely dissolved, 0.402 g (1.5 mmol) of NTDA, 0.366 g (3.0 mmol) of benzoic acid and 0.7 mL of isoquinoline were added thereto in sequence. The resulting mixture was stirred mechanically at ambient temperature for 1 h, and heated slowly to 80° C. and reacted at 80° C. for 4 h. The resulting reactant was then further heated to 180° C. and reacted at 180° C. for 20 h.

After the resulting reaction system was cooled to ambient temperature, 0.459 g (0.1 mmol) of X10 and 4 mL of m-cresol were added to the three-necked flask. The resulting mixture was stirred at ambient temperature for 1 h, then heated to 180° C. and reacted at 180° C. for 20 h. After the reaction, the resulting mixture was cooled to 80° C., and quickly poured into 150 mL of methanol, obtaining a filamentous precipitate. The filamentous precipitate was repeatedly washed with methanol and filtered by suction, obtaining a solid product. The solid product was dried under vacuum at 100° C. for 20 h, obtaining a crystalline sulfonated polyimide block copolymer X10Y15 with an average hydrophobic block length of 10 and an average hydrophilic block length of 15.

The X10Y15 was dissolved in m-cresol, obtaining a polymer solution with a concentration of 5 w/v %. The polymer solution was defoamed under vacuum, then cast onto a clean glass plate, and dried in an air oven at 110° C. for 5 h, obtaining a membrane. The membrane was peeled from the glass plate, and then soaked in hot methanol for 24 h to remove residual m-cresol from the membrane. The membrane obtained after removing residual m-cresol was transferred into a sulfuric acid solution with a concentration of 1.0 M, and soaked therein at ambient temperature for 72 h for a proton exchange. The membrane obtained after the proton exchange was taken out, washed to be neutral with deionized water, and dried in a vacuum oven at 120° C. for 20 h, obtaining a proton exchange membrane made of a crystalline sulfonated polyimide block copolymer.

FIG. 1 shows an infrared absorption spectrum of the proton exchange membrane made of a sulfonated polyimide block copolymer synthesized in Example 1. In FIG. 1, the bands at 1020 $cm^{-1}$ and 1086 $cm^{-1}$ are assigned to the symmetric and asymmetric stretching vibration of sulfonic acid group(s), the bands at 1580 $cm^{-1}$ and 1520 $cm^{-1}$ are assigned to the stretching vibration of C=C in the benzene ring frame, the band at 1350 $cm^{-1}$ is assigned to the stretching vibration of C—N in imide rings, the bands at 1710 $cm^{-1}$ and 1670 $cm^{-1}$ are assigned to the asymmetric and symmetric stretching vibration of C=O in imide rings, and the bands at 2847 $cm^{-1}$ and 2929 $cm^{-1}$ are assigned to the stretching vibration of —$CH_2$—. The functional group structure characteristics of the polymer were confirmed by the infrared spectrum analysis.

Figure 2:
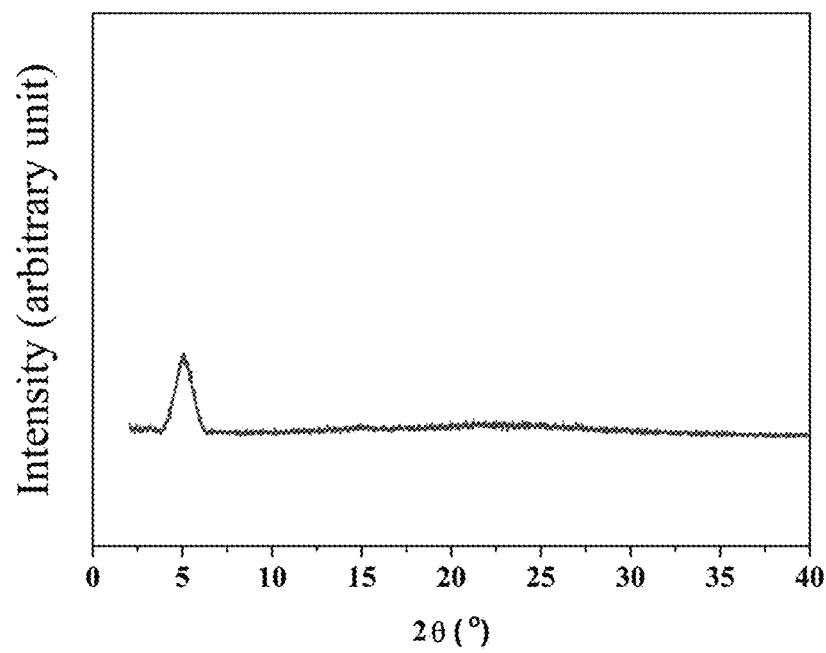
FIG. 2 shows an X-ray diffraction (XRD) pattern of a preferred embodiment of the present disclosure.

FIG. 2 shows an X-ray diffraction pattern of the proton exchange membrane made of a sulfonated polyimide block copolymer synthesized in Example 1. In FIG. 2, a sharp diffraction peak at 2θ of 5.05° is assigned to the crystalline phase formed by the aggregation of hydrophobic blocks, and a very broad diffraction peak at 2θ of 14.9° is assigned to the amorphous phase formed by the aggregation of hydrophilic blocks. This result of XRD pattern shows that the sulfonated polyimide block copolymer has a significant crystalline morphology.

Figure 3:
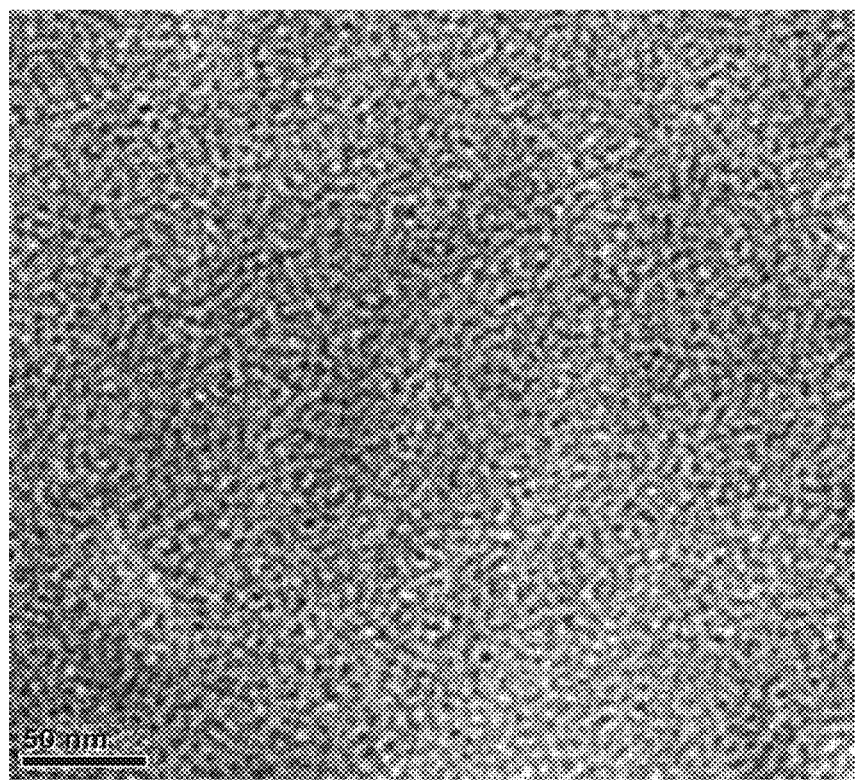
FIG. 3 is a transmission electron microscope image of a preferred embodiment of the present disclosure.

FIG. 3 is a transmission electron microscope photograph of the proton exchange membrane made of a sulfonated polyimide block copolymer synthesized in Example 1, wherein the black area represents hydrophilic domain, and the white area represents hydrophobic domain. It can be seen from FIG. 3 that the proton exchange membrane made of the block copolymer has a very significant microphase separation structure, and a hydrophilic domain size of 2-4 nm, wherein the hydrophilic domains are connected with each other to form good proton conduction channels.

Example 2

Under the protection of nitrogen, 2.95 g (11 mmol) of NTDA, 2.004 g (10 mmol) of DDA, 40 mL of m-cresol, 2.687 g (2.2 mmol) of benzoic acid and 3.0 mL of isoquinoline were added to a 100 mL fully-dried three-necked flask in sequence, and stirred mechanically at ambient temperature for 0.5 h. The resulting mixture was heated to 80° C. and reacted at the temperature for 4 h. The resulting reactant was further heated to 180° C. and reacted at the temperature for 20 h. After cooling to ambient temperature, the resulting reaction system was poured into 150 mL of methanol, obtaining an orange solid precipitate. The orange solid precipitate was repeatedly washed with methanol and filtered by suction. The resulting solid was subjected to an extraction with acetone until the eluent was colorless, and then dried under vacuum at 160° C. for 20 h, obtaining an anhydride-terminated polyimide oligomer, named as X10.

Under the protection of nitrogen, 1.639 g (3.1 mmol) of BAPBDS, 25 mL of m-cresol and 1.4 mL of triethylamine were added to a 100 mL fully-dried three-necked bottle in sequence, and stirred mechanically at ambient temperature. After BAPBDS was completely dissolved, 0.804 g (3.0 mmol) of NTDA (a molar ratio of BAPBDS to NTDA was 31:30), 0.732 g (6.0 mmol) of benzoic acid and 0.9 mL of isoquinoline were added thereto in sequence. The resulting mixture was stirred mechanically at ambient temperature for 1 h, then slowly heated to 80° C. and reacted at 80° C. for 4 h. The resulting reactant was further heated to 180° C. and reacted at 180° C. for 20 h.

After the resulting reaction system was cooled to ambient temperature, 0.459 g (0.1 mmol) of X10 and 4 mL of m-cresol were added to the three-necked flask. The resulting mixture was stirred at ambient temperature for 1 h, and then heated to 180° C. and reacted at 180° C. for 20 h. After the reaction, the resulting mixture was cooled to 80° C., and quickly poured into 150 mL of methanol, obtaining a filamentous precipitate. The filamentous precipitate was repeatedly washed with methanol and filtered by suction, obtaining a solid product. The solid product was dried under vacuum at 100° C. for 20 h, obtaining a crystalline sulfonated polyimide block copolymer X10Y30 with an average hydrophobic block length of 10 and an average hydrophilic block length of 30.

The X10Y30 was dissolved in m-cresol, obtaining a polymer solution with a concentration of 5 w/v %. The polymer solution was defoamed under vacuum, then cast onto a clean glass sheet, and dried in a blast oven at 110° C. for 5 h, obtaining a membrane. The membrane was peeled from the glass sheet, and then soaked in hot methanol for 24 h to remove residual m-cresol from the membrane. The membrane obtained after removing residual m-cresol was transferred into a sulfuric acid solution with a concentration of 1.0 M, and soaked therein at ambient temperature for 72 h for a proton exchange. The membrane after the proton exchange was taken out, washed to be neutral with deionized water, and dried in a vacuum oven at 120° C. for 20 h, obtaining a proton exchange membrane made of a crystalline sulfonated polyimide block copolymer.

Example 3

Under the protection of nitrogen, 5.632 g (21 mmol) of NTDA, 4.008 g (20 mmol) of DDA (a molar ratio of NTDA to DDA was 21:20), 40 mL of m-cresol, 5.374 g (4.4 mmol) of benzoic acid and 6.0 mL of isoquinoline were added to a 100 mL fully-dried three-necked flask in sequence, and stirred mechanically at ambient temperature for 0.5 h. The resulting mixture was heated to 80° C. and reacted at 80° C. for 4 h. The resulting reactant was further heated to 180° C. and reacted at 180° C. for 20 h. The resulting reaction system was cooled to ambient temperature, and then poured into 150 mL of methanol, obtaining an orange solid precipitate. The orange solid precipitate was repeatedly washed with methanol and filtered by suction. The resulting solid was subjected to an extraction with acetone until the eluent was colorless, and then dried under vacuum at 160° C. for 20 h, obtaining an anhydride-terminated polyimide oligomer, named as X20.

Under the protection of nitrogen, 1.639 g (3.1 mmol) of BAPBDS, 25 mL of m-cresol and 1.4 mL of triethylamine were added to a 100 mL fully-dried three-necked bottle in sequence, and stirred mechanically at ambient temperature. After BAPBDS was completely dissolved, 0.804 g (3.0 mmol) of NTDA (a molar ratio of BAPBDS to NTDA was 31:30), 0.732 g (6.0 mmol) of benzoic acid and 0.9 mL of isoquinoline were added thereto in sequence. The resulting mixture was stirred mechanically for 1 h at ambient temperature, then heated to 80° C. and reacted at 80° C. for 4 h. The resulting reactant was further heated to 180° C. and continuously reacted at 180° C. for 20 h.

After the resulting reaction system was cooled to ambient temperature, 0.898 g (0.1 mmol) of X20 and 6 mL of m-cresol were added to the three-necked bottle. The resulting mixture was stirred at ambient temperature for 1 h, then heated to 180° C. and reacted at 180° C. for 20 h. After the reaction, the resulting mixture was cooled to 80° C., and quickly poured into 150 mL of methanol, obtaining a filamentous precipitate. The filamentous precipitate was repeatedly washed with methanol and filtered by suction, obtaining a solid product. The solid product was dried under vacuum at 100° C. for 20 h, obtaining a crystalline sulfonated polyimide block copolymer X20Y30 with an average hydrophobic block length of 20 and an average hydrophilic block length of 30.

The X20Y30 was dissolved in m-cresol, obtaining a polymer solution with a concentration of 5 w/v %. The polymer solution was defoamed under vacuum, then cast onto a clean glass sheet, and dried in a blast oven at 110° C. for 5 h, obtaining a membrane. The membrane was peeled from the glass sheet, and then soaked in hot methanol for 24 h to remove residual m-cresol from the membrane. The membrane obtained after removing residual m-cresol was transferred into a sulfuric acid solution with a concentration of 1.0 M, and soaked therein at ambient temperature for 72 h for a proton exchange. The membrane obtained after the proton exchange was taken out, washed to be neutral with deionized water, and dried in a vacuum oven at 120° C. for 20 h, obtaining a proton exchange membrane made of a crystalline sulfonated polyimide block copolymer.

Example 4

Under the protection of nitrogen, 3.468 g (6.0 mmol) of 4,4'-(biphenyl dioxy) bis(1,8-naphthalene anhydride) (BPNDA), 1.002 g (5.0 mmol) of DDA (a molar ratio of BPNDA to DDA was 6:5), 40 mL of m-cresol, 1.344 g (1.1 mmol) of benzoic acid and 1.5 mL of isoquinoline were added to a 100 mL fully-dried three-necked flask in sequence, and stirred mechanically at ambient temperature for 0.5 h. The resulting mixture was heated to 80° C. and reacted at 180° C. for 4 h. The resulting reactant was further heated to 180° C. and reacted at 180° C. for 20 h. After being cooled to ambient temperature, the resulting reaction system was poured into 150 mL of methanol, obtaining an orange solid precipitate. The orange solid precipitate was repeatedly washed with methanol and filtered by suction. The resulting solid was subjected to an extraction with acetone until the eluent was colorless, and then dried under vacuum at 160° C. for 20 h, obtaining an anhydride-terminated polyimide oligomer, named as X5.

Under the protection of nitrogen, 1.109 g (2.1 mmol) of 4,4'-bis(4-aminophenoxy)biphenyl-3,3'-disulfonic acid (BAPBDS), 12.5 mL of m-cresol and 0.98 mL of triethylamine were added to a 100 mL fully-dried three-necked flask in sequence, and stirred mechanically at ambient temperature. After BAPBDS was completely dissolved, 0.536 g (2.0 mmol) of NTDA, 0.488 g (4.0 mmol) of benzoic acid and 0.53 mL of isoquinoline were added thereto in sequence. The resulting mixture was stirred mechanically at ambient temperature for 1 h, then heated to 80° C. and reacted at 80° C. for 4 h. The resulting reactant was further heated to 180° C. and continuously reacted at 180° C. for 20 h.

After the reaction system was cooled to ambient temperature, 0.431 g (0.1 mmol) of X5 and 4 mL of m-cresol were added to the three-necked flask. The resulting mixture was stirred at ambient temperature for 1 h, then heated to 180° C. and reacted at 180° C. for 20 h. After the reaction, the resulting mixture was cooled to 80° C., and quickly poured into 150 mL of methanol, obtaining a filamentous precipitate. The filamentous precipitate was repeatedly washed with methanol and filtered by suction, obtaining a solid product. The solid product was dried under vacuum at 100° C. for 20 h, obtaining a crystalline sulfonated polyimide block copolymer X5Y20 with an average hydrophobic block length of 5 and an average hydrophilic block length of 20.

The X5Y20 was dissolved in m-cresol, obtaining a polymer solution with a concentration of 5 w/v %. The polymer solution was defoamed under vacuum, then cast onto a clean glass sheet, and dried in a blast oven at 110° C. for 5 h, obtaining a membrane. The membrane was peeled from the glass sheet, and then soaked in hot methanol for 24 h to remove residual m-cresol from the membrane. The membrane obtained after removing residual m-cresol was transferred into a sulfuric acid solution with a concentration of 1.0 M, and soaked therein at ambient temperature for 72 h for a proton exchange. The membrane obtained after the proton exchange was taken out, washed to be neutral with deionized water, and dried in a vacuum oven at 120° C. for 20 h, obtaining a proton exchange membrane made of a crystalline sulfonated polyimide block copolymer.

Example 5

Under the protection of nitrogen, 2.95 g (11 mmol) of NTDA, 2.004 g (10 mmol) of DDA, 40 mL of m-cresol, 2.687 g (2.2 mmol) of benzoic acid and 3.0 mL of isoquinoline were added to a 100 mL fully-dried three-necked flask in sequence, and stirred mechanically for 0.5 h at ambient temperature. The resulting mixture was heated to 80° C. and reacted at 80° C. for 4 h. The resulting reactant was further heated to 180° C. and reacted at 180° C. for 20 h. After being cooled to ambient temperature, the resulting reaction system was poured into 150 mL of methanol, obtaining an orange solid precipitate. The orange solid precipitate was repeatedly washed with methanol and filtered by suction. The resulting solid was subjected to an extraction with acetone until the eluent was colorless, and then dried under vacuum at 160° C. for 20 h, obtaining an anhydride-terminated polyimide oligomer, named as X10.

Under the protection of nitrogen, 1.639 g (3.1 mmol) of 2,2'-bis(4-sulfophenoxy) benzidine (BSPOB), 20 mL of m-cresol and 1.4 mL of triethylamine were added to a 100 mL fully dried three-necked bottle in sequence, and stirred mechanically at ambient temperature. After BSPOB was completely dissolved, 0.804 g (3.0 mmol) of NTDA (a molar ratio of BSPOB to NTDA was 31:30), 0.732 g (6.0 mmol) of benzoic acid and 0.9 mL of isoquinoline were added thereto in sequence. The resulting mixture was stirred mechanically at ambient temperature for 1 h, then heated slowly to 80° C. and reacted at 80° C. for 4 h. The resulting reactant was further heated to 180° C. and continuously reacted at 180° C. for 20 h.

After the reaction system was cooled to ambient temperature, 0.459 g (0.1 mmol) of X10 and 4 mL of m-cresol were added to the three-necked bottle. The resulting mixture was stirred at ambient temperature for 1 h, then heated to 180° C. and reacted at 180° C. for 20 h. After the reaction, the resulting mixture was cooled to 80° C., and quickly poured into 150 mL of methanol, obtaining a filamentous precipitate. The filamentous precipitate was repeatedly washed with methanol and filtered by suction, obtaining a solid product. The solid product was dried under vacuum at 100° C. for 20 h, obtaining a crystalline sulfonated polyimide block copolymer X10Y30 with an average hydrophobic block length of 10 and an average hydrophilic block length of 30.

The X10Y30 was dissolved in m-cresol, obtaining a polymer solution with a concentration of 5 w/v %. The polymer solution was defoamed under vacuum, then cast onto a clean glass sheet, and dried in a blast oven at 110° C. for 5 h, obtaining a membrane. The membrane was peeled from the glass sheet, and then soaked in hot methanol for 24 h to remove residual m-cresol from the membrane. The membrane obtained after removing residual m-cresol was transferred into a sulfuric acid solution with a concentration of 1.0 M, and soaked therein at ambient temperature for 72 h for a proton exchange. The membrane obtained after the proton exchange was taken out, washed to be neutral with deionized water, and dried in a vacuum oven at 120° C. for 20 h, obtaining a proton exchange membrane made of a crystalline sulfonated polyimide block copolymer.

Comparative Example 1

Under the protection of nitrogen, 0.2004 g (1 mmol) of DDA, 0.793 g (1.5 mmol) of BAPBDS, 17 mL of m-cresol, and 0.7 mL of triethylamine were added to a 100 mL fully-dried three-necked flask in sequence, and stirred until the dianhydride monomers were completely dissolved. 1 mL of isoquinoline, 0.635 g (2.5 mmol) of NTDA and 0.635 g (5.2 mmol) of benzoic acid were subsequently added thereto. The resulting mixture was stirred at ambient temperature for 0.5 h, then slowly heated to 80° C. and reacted at 80° C. for 4 h. The resulting reactant was further heated to 180° C. and continuously reacted at 180° C. for 20 h. The heating was stopped. The resulting reaction mixture was cooled to 80° C., and poured into 200 mL of methanol, obtaining a filamentous precipitate in the mixture. The mixture was filtered by suction. The obtained filamentous product was fully washed with methanol, and then dried under vacuum at 100° C. for 10 h, obtaining a sulfonated polyimide random copolymer.

The sulfonated polyimide random copolymer was dissolved in m-cresol, obtaining a polymer solution with a concentration of 5 w/v %. The polymer solution was defoamed under vacuum, then cast onto a clean glass sheet, and dried in a blast oven at 110° C. for 5 h, obtaining a membrane. The membrane was peeled from the glass sheet, and then soaked in hot methanol for 24 h to remove residual m-cresol from the membrane. The membrane obtained after removing residual m-cresol was transferred into a sulfuric acid solution with a concentration of 1.0 M, and soaked therein at ambient temperature for 72 h for a proton exchange. The membrane obtained after the proton exchange was taken out, washed to be neutral with deionized water, and dried in a vacuum oven at 120° C. for 20 h, obtaining a proton exchange membrane made of a sulfonated polyimide random copolymer.

Ion Exchange Capacity and Proton Conductivity Test 0.2-0.3 g of dried sample membrane was accurately weighed, cut into pieces, placed into 50 mL of saturated sodium chloride solution, and stirred at ambient temperature for three days. The resulting membrane was taken out and washed three times with a small amount of deionized water. All the eluates were collected and mixed with saturated sodium chloride solution used previously, obtaining a mixed solution. The mixed solution was titrated with a sodium hydroxide solution of known concentration. Ion exchange capacity (IEC) was calculated according to the following formula: IEC=$C_{NaOH} \cdot V_{NaOH}$/m, where $C_{NaOH}$ represents the concentration of the NaOH solution, $V_{NaOH}$ represents the volume of the NaOH solution consumed during the titration, and m represents the mass of the weighed polymer membrane. The proton conductivity of the proton exchange membranes made of a crystalline sulfonated polyimide block copolymer prepared in Examples 1 to 5, the proton exchange membrane made of an amorphous sulfonated polyimide random copolymer prepared in Comparative Example 1, and Nafion212 proton exchange membrane manufactured by DuPont Company of America were tested on a Hioki3553Hitester AC impedance tester by an AC impedance method under conditions: a test frequency ranging from 42 Hz to 5 MHz, a test medium of ultrapure water, and a temperature for test of 40° C. or 80° C. The proton conductivity σ (unit: S/cm) was calculated according to the following formula: σ=D/(LBR), where D represents the distance between two electrodes (5 mm), L represents the width (5 mm) of the membrane sample, B represents the thickness (30-50 μm) of the membrane sample, and R represents the impedance of the tested sample.

The results of ion exchange capacity and proton conductivity tests are shown in Table 1. The membranes made of a sulfonated polyimide block copolymer in Examples 1-5 have similar ion exchange capacity to the membrane made of the sulfonated polyimide random copolymer in Comparative Example 1, while higher ion exchange capacity than Nafion212. Furthermore, the membranes made of a sulfonated polyimide block copolymer in Examples 1-5 exhibit significantly higher proton conductivity at 40° C. and 80° C., compared with the membrane made of a sulfonated polyimide random copolymer in Comparative Example 1 and Nafion212.

TABLE 1

Results of the ion exchange capacity and proton conductivity test

| | Ion exchange capacity (meq/g) | Proton conductivity (S/cm) | |
| --- | --- | --- | --- |
| | | 40° C. | 80° C. |
| Example 1 | 1.88 | 0.107 | 0.175 |
| Example 2 | 2.12 | 0.121 | 0.197 |
| Example 3 | 1.87 | 0.094 | 0.158 |
| Example 4 | 1.92 | 0.112 | 0.169 |
| Example 5 | 2.10 | 0.129 | 0.206 |
| Comparative Example 1 | 1.94 | 0.075 | 0.134 |
| Nafion 212 | 0.91 | 0.081 | 0.154 |

Power Generation Performance Test

A catalyst ink was prepared from 40% Pt/C (Johnson Matthey Company) as an electrode catalyst and Nafion as a binder. The prepared catalyst ink was then sprayed onto both sides of the proton exchange membrane, with an effective area of 5 cm$^2$ for each side. 0.5 mg/cm$^2$ of a platinum catalyst was loaded for each of anode and cathode. A fuel cell test equipment (Scribner, 850e, USA) was used to test the power generation performance of single cells assembled from the membranes in Examples 1-5, the membrane in Comparative Example 1 and Nafion212, respectively. The power generation performance of all single cells were tested under conditions: flow rates of anode gas (hydrogen) and cathode gas (oxygen) of 200 mL/min, a temperature of 95° C., a back pressure of 150 KPa, the same humidification conditions for anode gas and cathode gas, and relative humidity of anode gas and cathode gas of 50%, respectively.

The test results are shown in Table 2. Compared with the single cell assembled from the membrane made of a sulfonated polyimide random copolymer prepared in Comparative Example 1, the single cells assembled from the proton exchange membranes made of sulfonated polyimide block copolymers prepared in Examples 1-5 have slightly higher open circuit voltages, while much higher peak power densities (up to about 1.6 times Comparative Example 1). Compared with the single cell assembled from Nafion212, the single cells assembled from the proton exchange membranes made of a sulfonated polyimide block copolymer prepared in Examples 1-5 have not only higher open circuit voltages, but also higher peak power densities (up to about 1.5 times Nafion212). The results indicate that the single cells assembled from the proton exchange membranes made of a sulfonated polyimide block copolymer prepared in Examples 1-5 exhibit better power generation performance.

TABLE 2

Results of the power generation performance test

| Proton exchange membrane | Thickness (μm) | Open circuit voltage (V) | Peak power density (mW/cm$^2$) |
| --- | --- | --- | --- |
| Example 1 | 30 | 1.02 | 939 |
| Example 2 | 31 | 1.04 | 945 |
| Example 3 | 30 | 1.02 | 875 |
| Example 4 | 32 | 1.03 | 901 |
| Example 5 | 31 | 1.06 | 1024 |
| Comparative Example 1 | 30 | 1.01 | 636 |
| Nafion 212 | 55 | 0.97 | 682 |

Figures 1, 4:
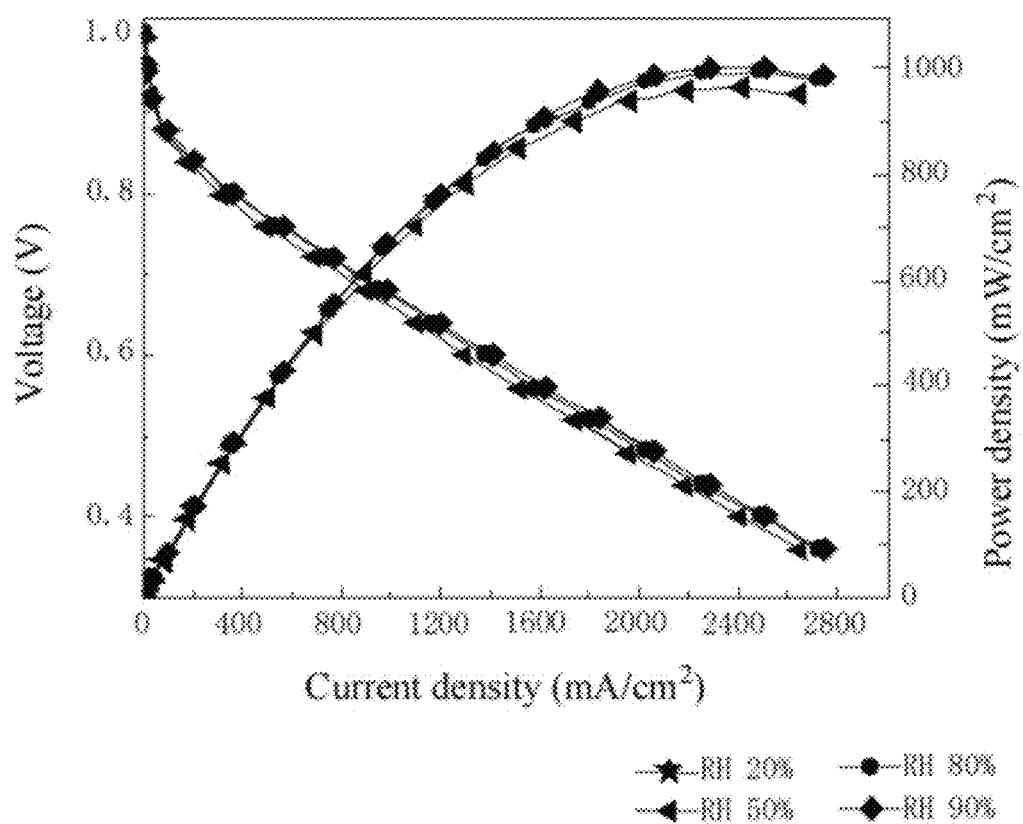
Figures 2, 4:
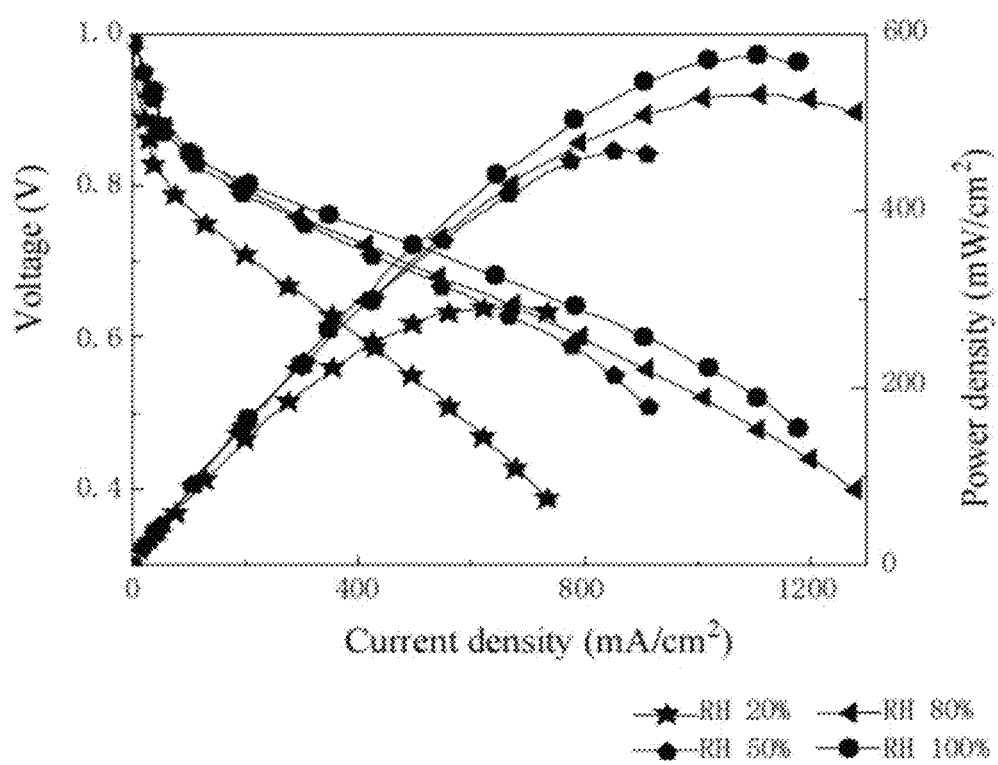

As shown in FIGS. 4-1 and 4-2, at 80° C., the single cell assembled from the proton exchange membrane made of a sulfonated polyimide block copolymer exhibits a power generation performance almost independent of humidification conditions, and exhibits high power generation performance (with a peak power density of 990 mW/cm$^2$). However, the single cell assembled from the proton exchange membrane made of a sulfonated polyimide random copolymer exhibits a poor power generation performance as a whole, which is closely related to humidification conditions. With the decrease of relative humidity, the cell exhibits worse power generation performance, and has a peak power density of only 290 mW/cm$^2$ at very low relative humidity (20%).

Figure 5:
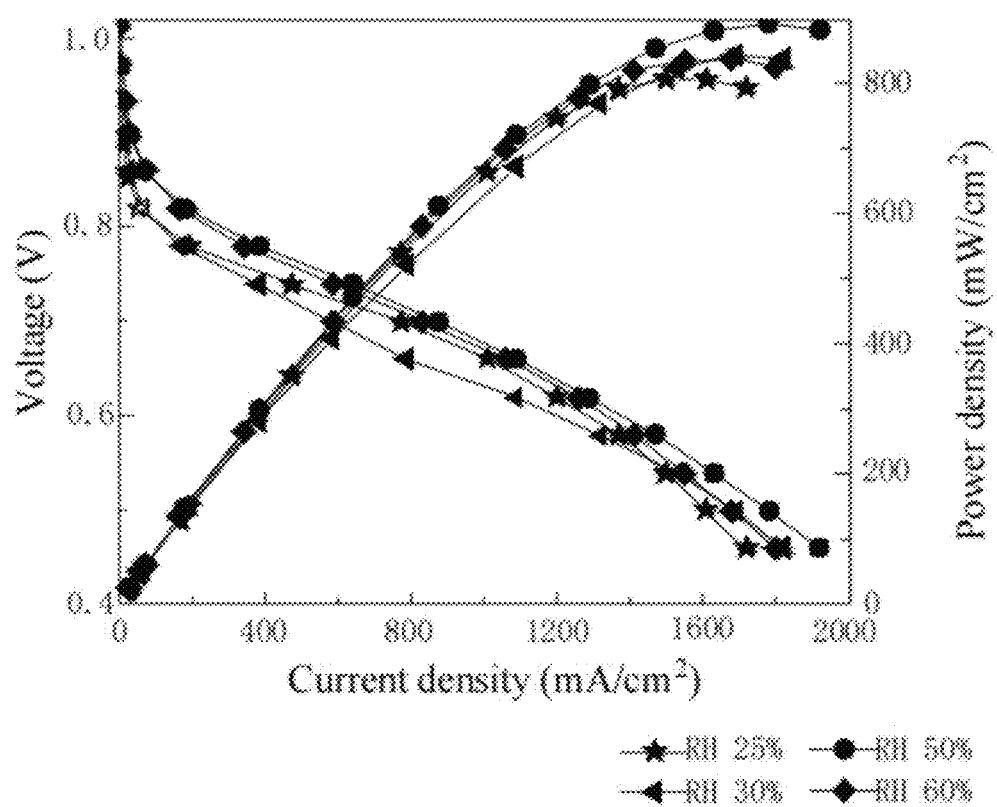
FIG. 5 shows polarization curves of a preferred embodiment of the present disclosure at 110° C. and different humidification conditions (relative humidity: 25%, 30%, 50%, and 60%).

As shown in FIG. 5, the power generation performance of the single cells assembled from the proton exchange membranes made of sulfonated polyimide block copolymer are little affected by temperature. Even if the cell temperature rises to 110° C., the cells still exhibit high power generation performance (with a peak power density of 807 mW/cm$^2$). The power generation performance is almost independent of humidification conditions.

The preferred embodiments of the present disclosure have been described in detail above. It should be understood that many modifications and changes may be made according to the concept of the present disclosure by those of ordinary skill in the art without creative labor. Therefore, all technical solutions that could be obtained by those skilled in the art through logical analysis, reasoning or limited experiments on the basis of the prior art according to the concept of the present disclosure should be within the protection scope defined by the claims.

What is claimed is:

1. A proton exchange membrane made of a crystalline sulfonated polyimide block copolymer, wherein the crystalline sulfonated polyimide block copolymer has a chemical structure as shown in Formula I:

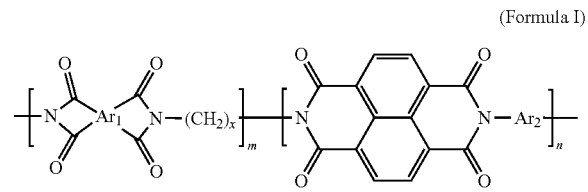

(Formula I)

in which,

Ar$_1$ group is an aromatic group containing a naphthyl group;

Ar$_2$ group is an aromatic group containing at least one sulfonate group; and x is in the range of 5-100, m is in the range of 1-200, and n is in the range of 5-500.

2. The proton exchange membrane of claim 1, wherein the naphthyl group of Ar$_1$ group is connected with

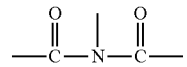

of Formula I to form a six-membered ring.

3. The proton exchange membrane of claim 1, wherein Ar$_1$ group is selected from the group consisting of

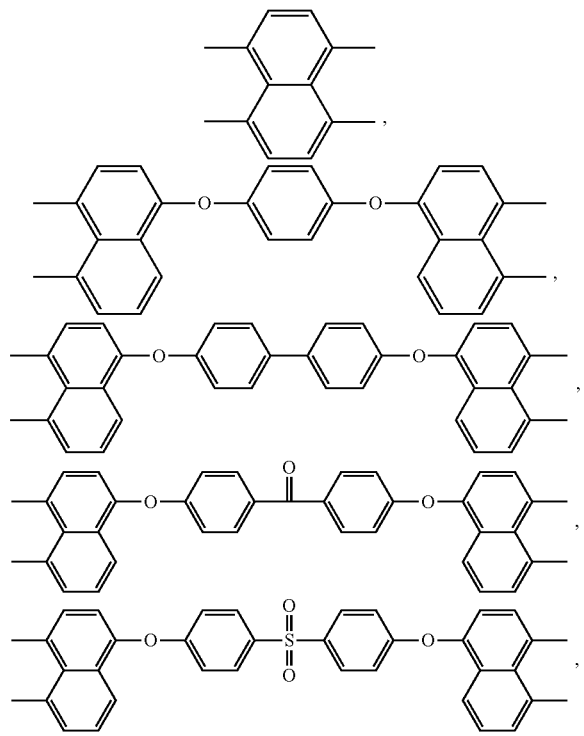

-continued
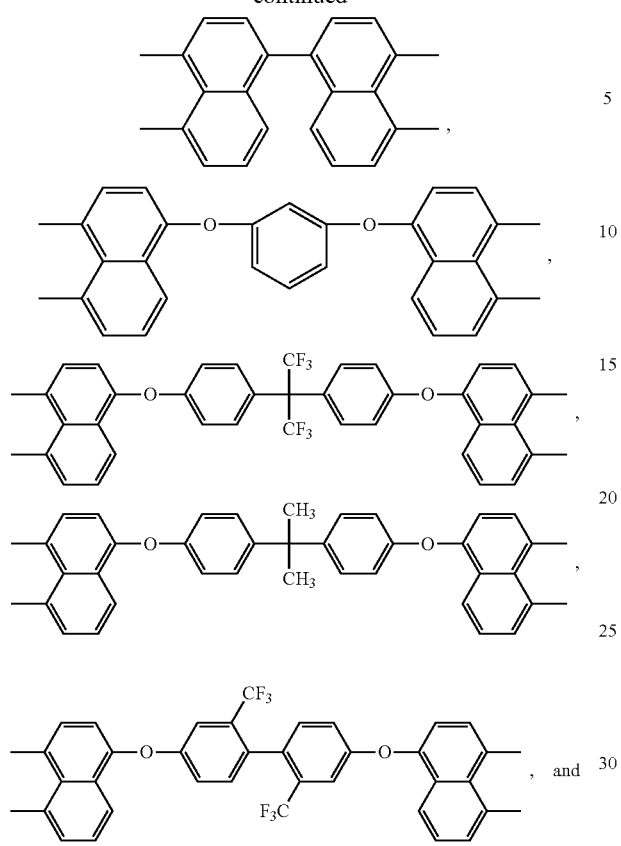
and
4. The proton exchange membrane of claim 1, wherein $Ar_2$ group is selected from the group consisting of
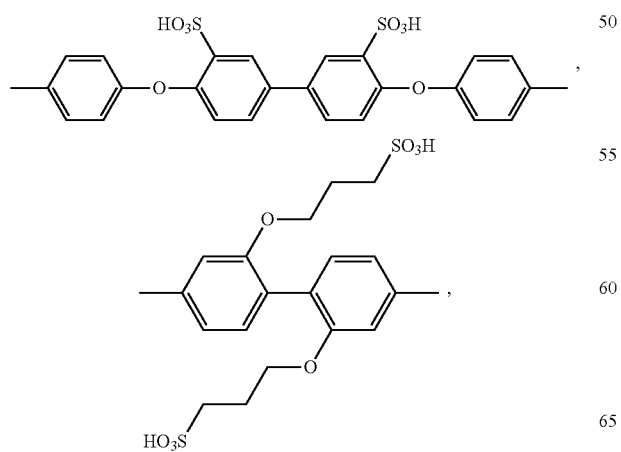
-continued
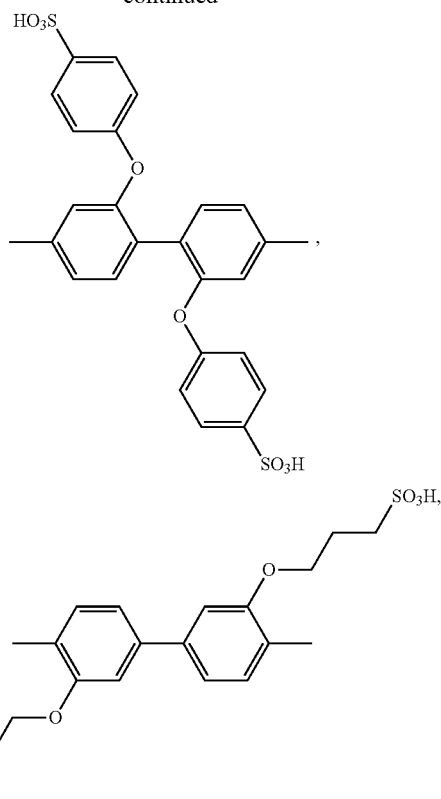
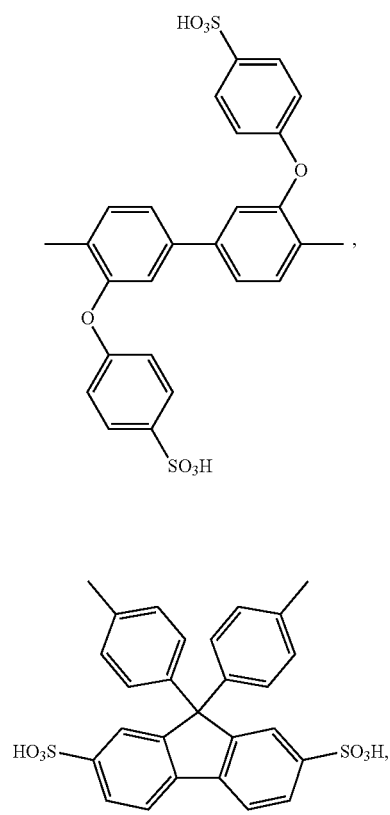

-continued

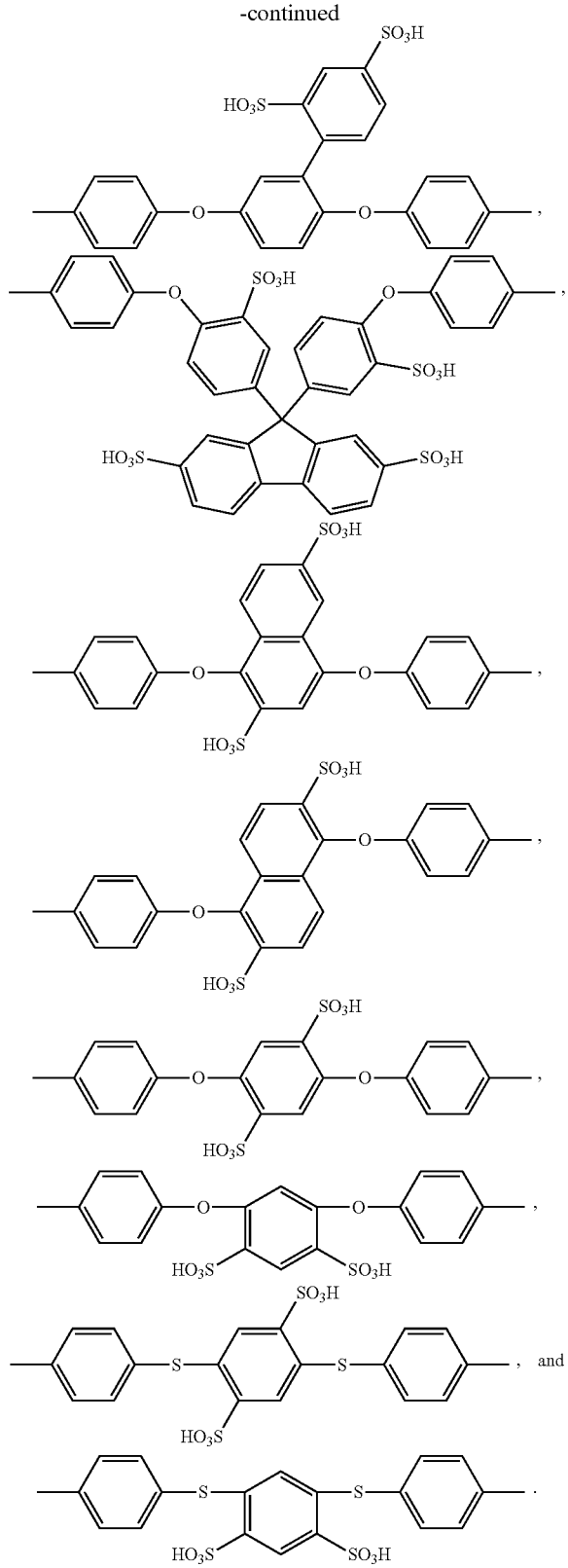

5. A method for preparing the proton exchange membrane made of a crystalline sulfonated polyimide block copolymer of claim 1, comprising
step 1, adding an $Ar_1$-type dianhydride monomer, an aliphatic diamine monomer and a phenolic solvent into a first container, heating to a temperature of 50-120° C. and reacting at the temperature for 1-10 h, then heating to a temperature of 150-200° C. and reacting at the temperature for 2-30 h, to obtain a polyimide hydrophobic block oligomer,
step 2, adding an $Ar_2$-type sulfonated diamine monomer, 1,4,5,8-naphthalenetetracarboxylic dianhydride (NTDA), a phenolic solvent and an organic base into a second container, heating to a temperature of 50-120° C. and reacting at the temperature for 1-10 h, then heating to a temperature of 150-200° C. and reacting at the temperature for 2-30 h, to obtain a solution of a sulfonated polyimide hydrophilic block oligomer;
step 3, adding the polyimide hydrophobic block oligomer obtained in step 1 and a phenolic solvent into the second container, and heating to a temperature of 150-200° C. and reacting at the temperature for 2-72 h, to obtain a crystalline sulfonated polyimide block copolymer; and
step 4, making the crystalline sulfonated polyimide block copolymer into a membrane, and subjecting the membrane to a proton exchange, to obtain the proton exchange membrane made of a crystalline sulfonated polyimide block copolymer.

6. The method of claim 5, wherein the method further comprises after cooling the resulting reaction system of step 1 to ambient temperature, adding an organic solvent thereto to yield a first precipitate, and subjecting the first precipitate to a suction filtration and a vacuum drying to obtain a dried polyimide hydrophobic block oligomer.

7. The method of claim 5, wherein the method further comprises after cooling the resulting reaction system of step 3 to a temperature of 20-120° C., adding an organic solvent to yield a second precipitate, and subjecting the second precipitate to a suction filtration and a vacuum drying to obtain a dried crystalline sulfonated polyimide block copolymer.

8. The method of claim 5, wherein in step 4, making the crystalline sulfonated polyimide block copolymer into a membrane is conducted as follows:
dissolving the crystalline sulfonated polyimide block copolymer into a phenolic solvent to obtain a crystalline sulfonated polyimide block copolymer solution, casting the crystalline sulfonated polyimide block copolymer solution onto a glass plate, and drying at a temperature of 90-110° C. for 5-15 h to obtain a membrane, and peeling the membrane from the glass plate.

9. The method of claim 5, wherein in step 4, the proton exchange is conducted as follows:
soaking the membrane in an alcohol solution to remove a residual solvent from the membrane, and soaking the membrane obtained after removing the residual solvent in a proton acid solution for a proton exchange.

10. The method of claim 6, wherein the organic solvent is one or more selected from the group consisting of methanol, ethanol, isopropanol, acetone and ethyl acetate.

11. The method of claim 5, wherein the phenolic solvent is one or more selected from the group consisting of m-cresol, o-cresol, p-cresol, o-chlorophenol, m-chlorophenol and p-chlorophenol.

12. The method of claim 5, wherein in step 2, the organic base is one or more selected from the group consisting of triethylamine, trimethylamine, pyridine and 4-(N,N-dimethylamino) pyridine.

13. The method of claim 5, wherein the method further comprises adding a catalyst in steps 1 and 4, wherein the catalyst is one or more selected from the group consisting of acetic acid, benzoic acid, chlorobenzoic acid, hydroxybenzoic acid, quinoline, isoquinoline, and pyridine.

14. A cell, which is assembled by the proton exchange membrane made of a crystalline sulfonated polyimide block copolymer of claim 1.

15. The cell of claim 14, wherein the cell is a fuel cell.

16. The proton exchange membrane of claim 2, wherein $Ar_1$ group is selected from the group consisting of

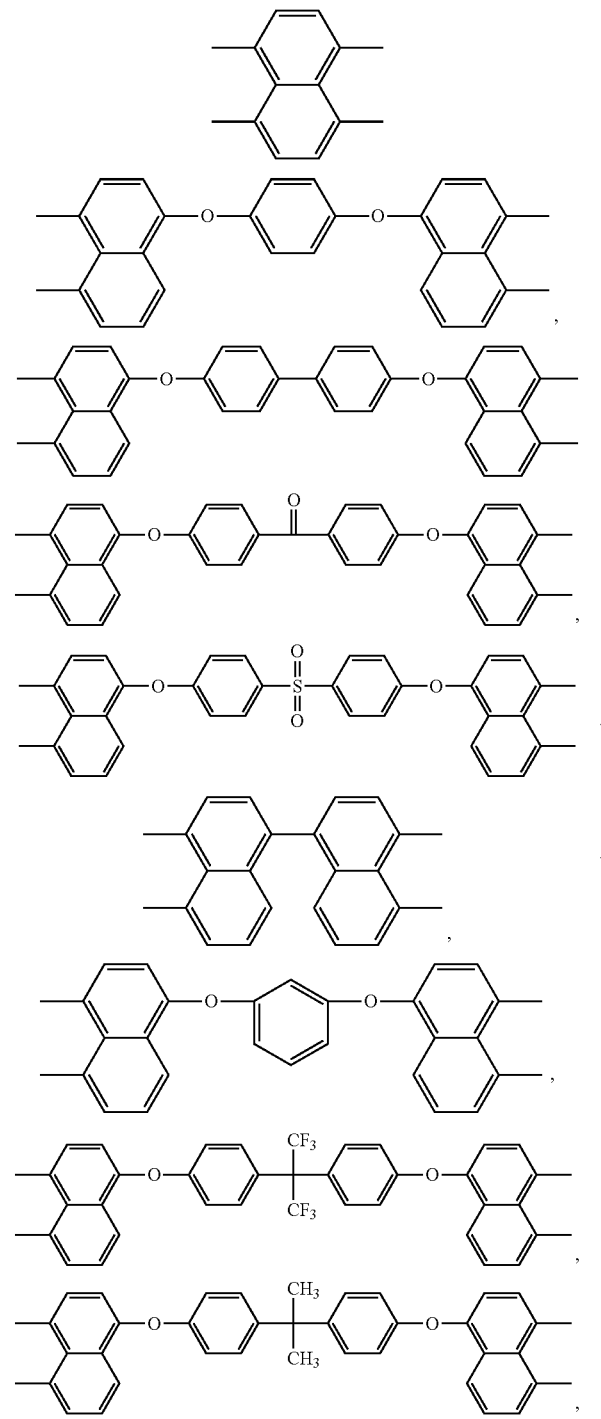

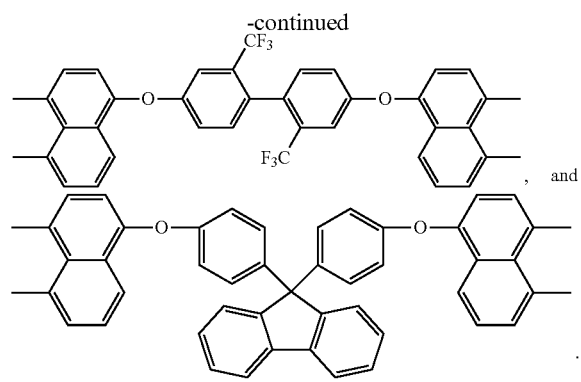

17. The proton exchange membrane of claim 2, wherein $Ar_2$ group is selected from the group consisting of

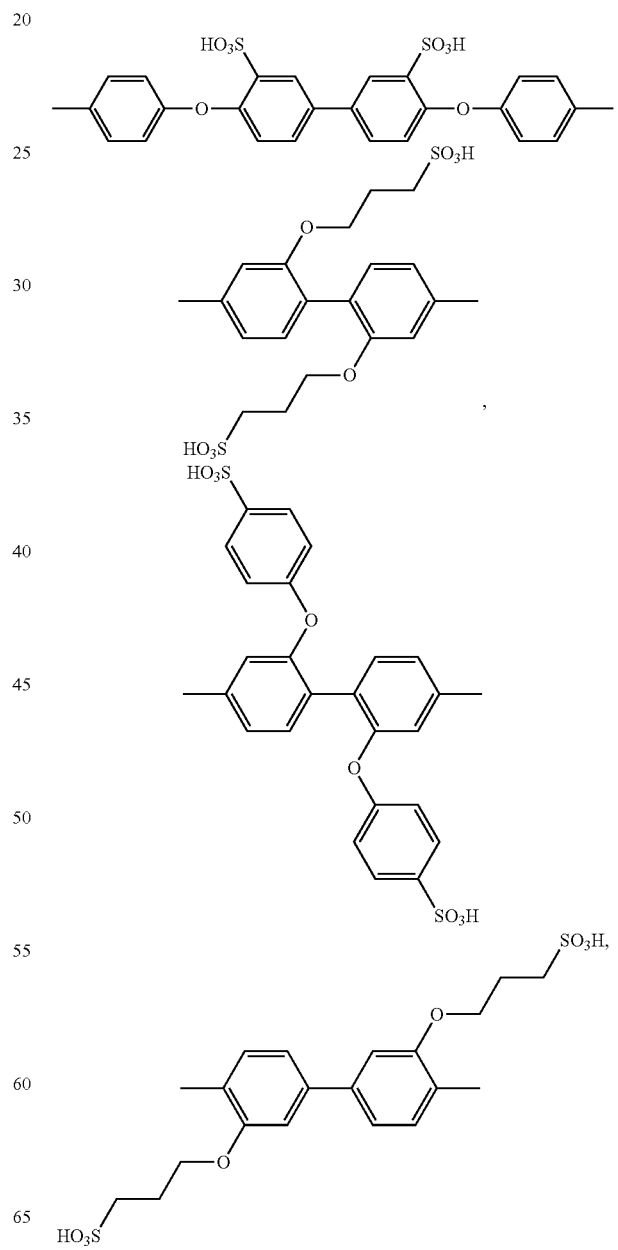

-continued
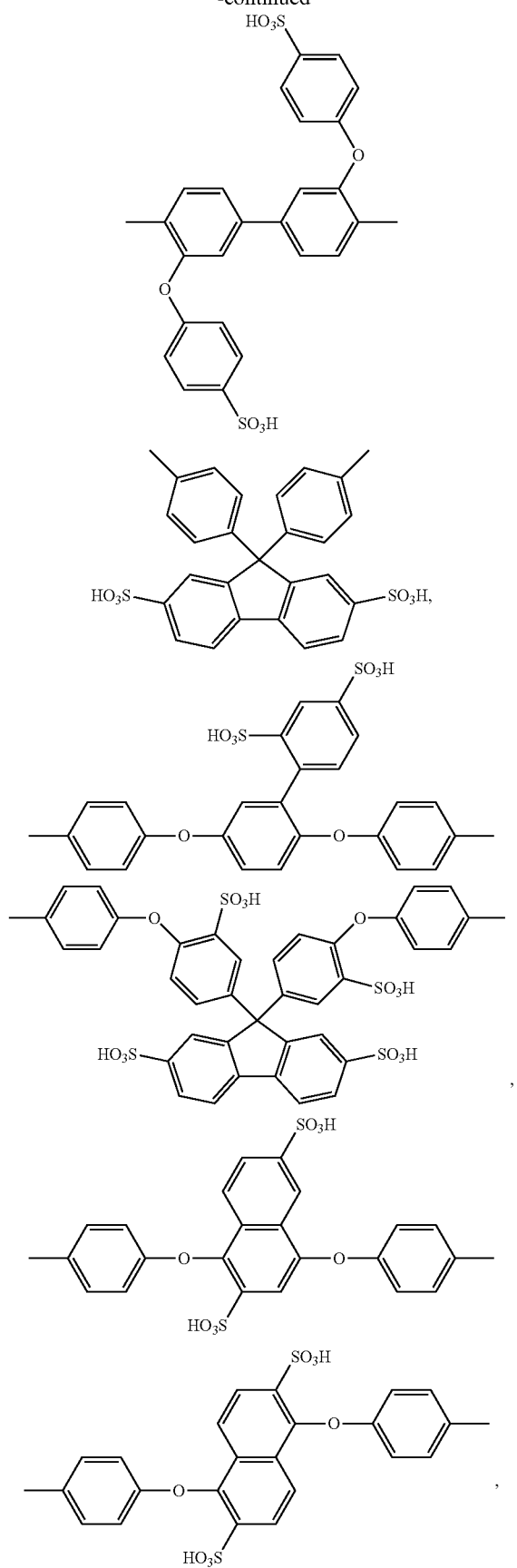
-continued
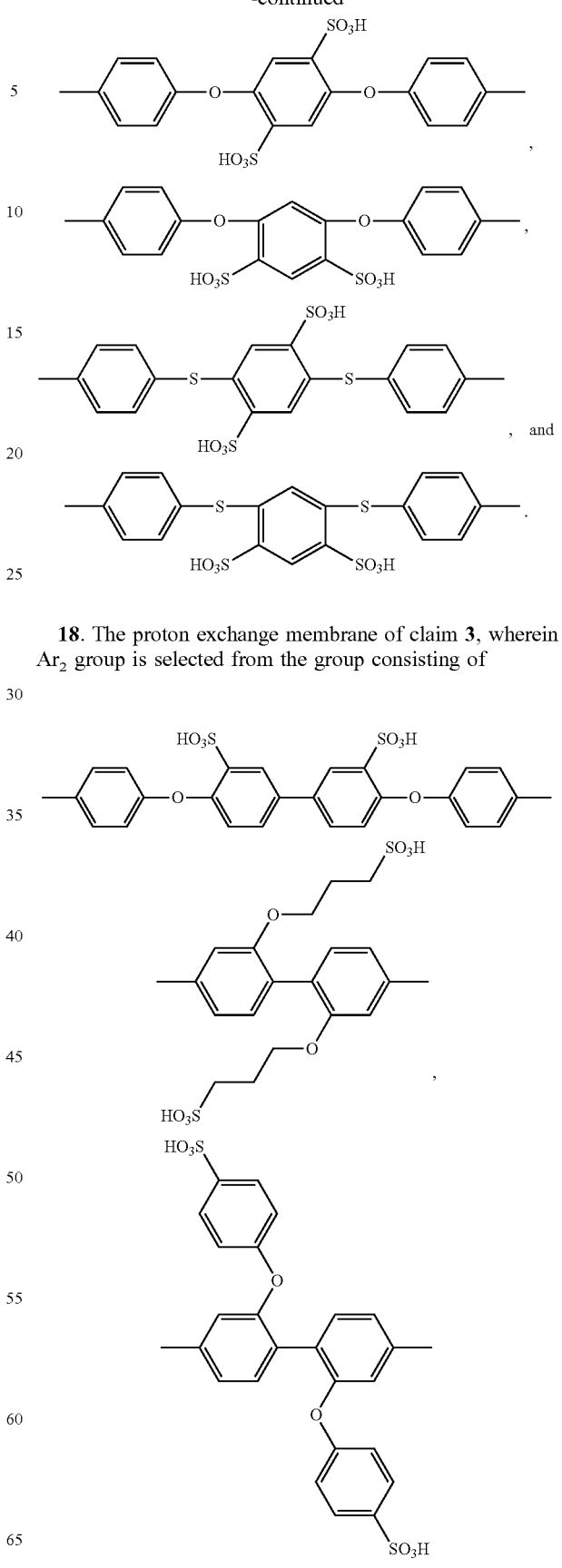
18. The proton exchange membrane of claim 3, wherein Ar₂ group is selected from the group consisting of

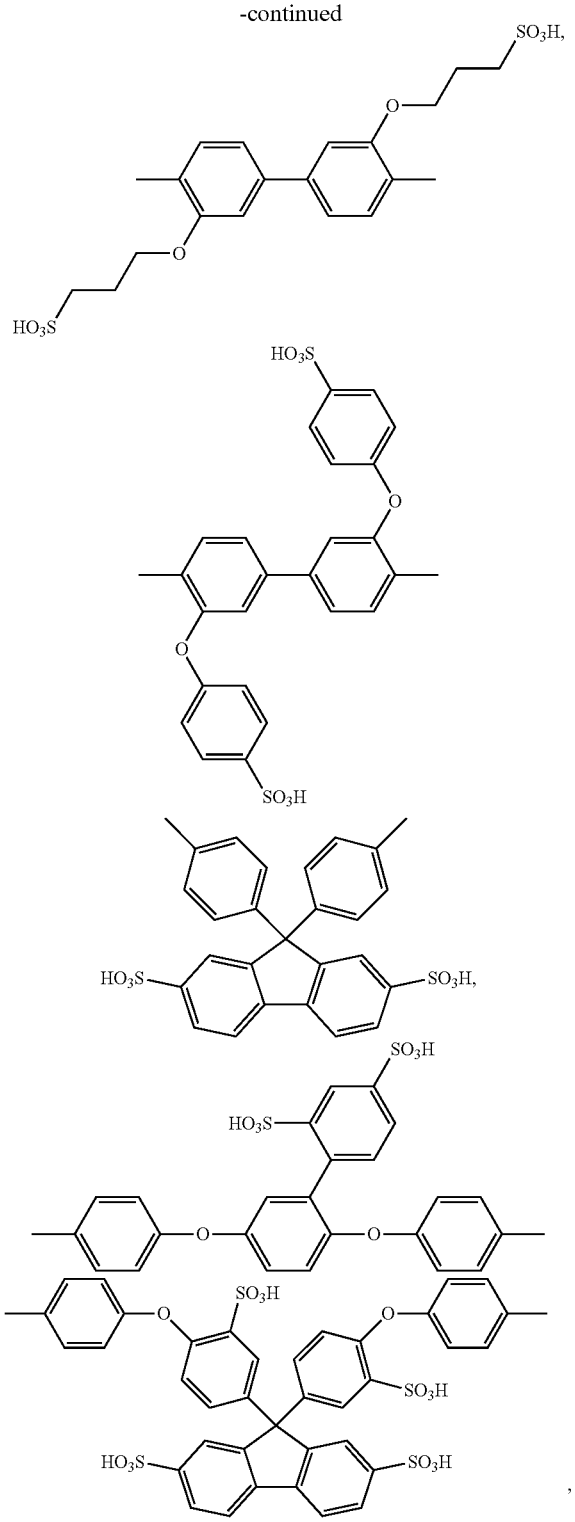
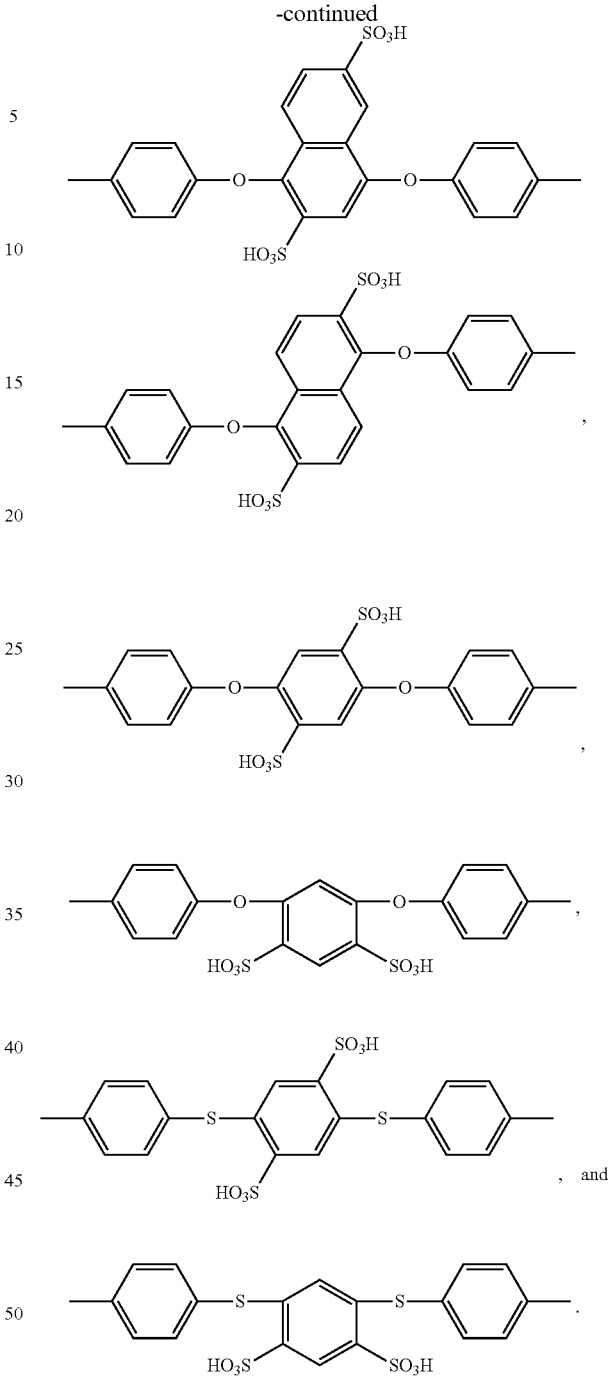
19. The method of claim 7, wherein the organic solvent is one or more selected from the group consisting of methanol, ethanol, isopropanol, acetone and ethyl acetate.
* * * * *